United States Patent [19]

Ogawa et al.

[11] 4,198,293
[45] Apr. 15, 1980

[54] TUBULAR MEMBRANE SEPARATION PROCESS AND APPARATUS THEREFOR

[75] Inventors: Toshio Ogawa, Takahagi; Katsuya Ebara, Mito; Sankichi Takahashi, Hitachi, all of Japan

[73] Assignees: Hitachi, Ltd.; Hitachi Plant Engineering and Construction Co., Ltd., Japan

[21] Appl. No.: 883,811

[22] Filed: Mar. 6, 1978

Related U.S. Application Data

[63] Continuation of Ser. No. 666,415, Mar. 12, 1976, abandoned.

[30] Foreign Application Priority Data

Mar. 22, 1975 [JP] Japan .................. 50-33536

[51] Int. Cl.$^2$ .................. B01D 13/00; B01D 31/00
[52] U.S. Cl. .................. 210/23 H; 210/79; 210/321 R; 210/332; 210/353
[58] Field of Search .............. 210/321 R, 23 H, 23 F, 210/353, 433 M, 355, 73 R, 79, 189, 332, 335

[56] References Cited

U.S. PATENT DOCUMENTS

| | | | |
|---|---|---|---|
| 3,425,562 | 2/1969 | Hamer | 210/321 |
| 3,541,006 | 11/1970 | Bixler et al. | 210/23 |
| 3,552,574 | 1/1971 | Lowe | 20/353 |
| 3,795,317 | 3/1974 | Van Zon | 210/321 |
| 3,819,513 | 6/1974 | Ishii et al. | 210/23 |
| 3,856,569 | 12/1974 | Strong | 210/23 |
| 3,883,431 | 5/1975 | Ishii et al. | 210/134 |
| 3,974,068 | 8/1976 | Ebner et al. | 210/23 F |

OTHER PUBLICATIONS

"Reverse Osmosis at Coalinga, California", J. W. McCutchan et al., Water and Sewage Works, Sep. 1971.
"An Analsis of R.O. Characteristics of Am. Standard Tubular Module", Desalination, 16 (1975), pp. 235–244, Ohya et al.

*Primary Examiner*—Charles N. Hart
*Assistant Examiner*—David R. Sadowski
*Attorney, Agent, or Firm*—Craig and Antonelli

[57] ABSTRACT

A tubular membrane separation apparatus and process, for reverse osmosis or ultrafiltration, with an arrangement for removing undesirable deposit from semipermeable membrane surfaces. The apparatus is of the multiple-stage type wherein the number of tubular modules per stage gradually decreases in a pattern like a Christmas tree laid on its side. Elastic elements are forced through the tubular modules lined with the semipermeable membrane, the number of the elements being gradually decreased stage by stage, so that the deposit is mechanically rubbed off from the membrane surfaces with an optimum number of elastic elements for each stage.

17 Claims, 4 Drawing Figures

TUBULAR MEMBRANE SEPARATION PROCESS AND APPARATUS THEREFOR

This is a continuation of application Ser. No. 666,415 filed Mar. 12, 1976, now abandoned.

This invention relates to a tubular membrane separation process and apparatus therefor suited for varied applications including the purification of wastewater; desalting, concentration, separation, and purification of proteins, enzymes, and nucleic acids; treatment of industrial liquid wastes, such as plating solutions; and concentration and refining of chemicals.

Membrane separation techniques are used to separate molecules of different sizes in solutions subjected to pressure, with the aid of membranes. Of these processes based on pressure difference across a membrane, the one for separating relatively large molecules from small molecules, as of water, is called ultrafiltration. When a solution containing solute molecules of relatively small sizes, as of sodium chloride, is to be treated, a pressure greater than the normal osmotic pressure is applied to the solution for solute separation through the membrane. The process is known as reverse osmosis. The distinctions between these two techniques are not necessarily clearcut, since they both involve the separation of a solute from a solution by means of a membrane with the application of pressure. The invention will now be described as embodied in a tube type apparatus for reverse osmosis.

The apparatus of the character uses a semipermeable membrane which permits the passage of the solvent in a solution but hinders that of the solute, and comprises tubes of such membrane installed in pressure-resistant pipes. A solution to be treated is pressurized to a predetermined level by a pump, caused to flow through the tubular modules at a predetermined flow velocity, and the solvent that has permeated out through the membrane is collected. With the construction described, the apparatus is generally accepted as one for the treatment of liquids, especially of water.

To illustrate the construction in more detail, the individual modules of the tube type reverse osmosis apparatus consist of tubes of semipermeable membrane held in position by exterior support members of water-permeable material and placed in porous or perforated, pressure-resistant pipes. As a solution flows inside the tubes, part of the solvent moves through the membranes, support members, and pipe walls, in the form of waterdrops trickling down over the outside surfaces of the pressure-resistant pipes. The drops are collected while the rest of the solution held back by the semi-permeable membranes is separately discharged. The rest of the solution that has flown through the tubes unpermeatingly is called concentrated brine because its solute concentration is increased in proportion to the volume of the solvent lost by the permeation. The semipermeable membrane most often employed is of organic cellulose acetate, and the membrane support members are fabricated from a fibrous material having a low resistance to water passage and capable of withstanding pressure to a certain degree. The pressure-resistant pipes are FRP (Fiber Reinforced Plastics) pipes or stainless steel pipes formed with tiny holes at given intervals throughout.

Normally water contains some suspended solids. Above all, the water that must be treated often contains, in addition to suspended solids, organic matter and even heavy metals such as iron and manganese. In this connection, one of major problems yet to be solved for successful water treatment by reverse osmosis is the deposition of such solid contents of water on the semipermeable membrane surfaces and a consequent decrease in the rate of water permeation. This is particularly true with the purification of wastewater having high organic contents, such as sewage, in which case the organic matter and suspended solids tend to slime the membrane surfaces. In case of inorganic wastewater which contains ions of readily oxidizable metals, such as iron and manganese, the fluid will deposit the oxides on the membrane surfaces. Thus, the sliming or deposition, whichever may occur, will result in a reduction in the permeation rate of water.

Removal of the deposit from the semipermeable membrane surfaces has hitherto been attempted at in two ways. One proposed method is washing based on fluid mechanics whereby wash liquid is forced at a high velocity through the tubes to strip the deposit from the inside surfaces of the semipermeable membranes. The other is a chemical method which consists of adding a certain acid to the wash liquid so that the deposit is dissolved away from the membrane surfaces. It has, however, become clear that neither of the proposed methods can completely and easily remove the deposit from the membranes. No commercially practical cleaning method has been established. This is because the deposit on the semipermeable membranes is slowly but constantly formed during the operation of the reverse osmosis apparatus and, moreover, the deposit growing on the membrane surfaces is pressed against them under such high pressure (usually at 40–80 kg/cm$^2$ during the process of reverse osmosis) that the fluid-mechanical or chemical washing cannot eliminate the deposit completely.

Another disadvantage common to the conventional washing methods is that, for each wash, it is necessary to interrupt the operation of the reverse osmosis apparatus, or cut off the system of the solution being treated, and exchange the solution with the wash liquid. Washing is usually performed once a day, each time for about 1 to 2 hours, and this daily downtime accordingly reduces the operation efficiency. An additional drawback of the chemical washing is that the washing cannot be disposed of before being treated somehow or other (for example, through the adjustment of its pH).

Therefore, it is an object of this invention to provide a tubular membrane separation apparatus which can rapidly and easily remove the deposit from the semipermeable membrane surfaces without damaging the membrane surfaces without damaging the membranes.

Another object of the invention is to remove the deposit continuously without using any special wash liquid, thereby enabling the apparatus to achieve improved operation efficiency.

Yet another object of the invention is to provide a tubular membrane separation apparatus which employs mechanical cleaning means for removal of the deposit from the semipermeable membrane surfaces, with no necessity of secondary measure to be taken after the cleaning.

An experiment was conducted to see how the growth of deposit on the semipermeable membrane surfaces reduces the quantity of water that passes through the membranes. It was found, as the result, that the permeation rate of water continues to decrease and, in about 30 hours of operation, the rate is reduced to about half, with a considerable amount of deposition on the semipermeable membrane surfaces. The experiment indicated that the solvent in the solution begins to deposit on the semipermeable membrane surfaces immediately after the start of operation and, in the absence of a countermeasure, the deposit grows gradually. The operation pressure applied to the feed forces the deposit solidly and adhesively against the membrane surfaces and renders it difficult to strip the surfaces of the deposit. The present invention contemplates removing the deposit in the early stage of growth or before it becomes too adhesive to strip, by rubbing it off from the membrane surfaces with elastic elements, e.g., sponge balls. For the purpose of the invention, the term sponge balls is used to mean balls made of natural rubber or synthetic rubber, such as butyl, chloroprene, styrene-butadiene, high-styrene, nitrile, or urethane rubber. They are so formed as to be substantially softer than the semipermeable membranes to be encountered, lest they should damage the membrane surfaces.

It is a feature of the present invention that, in cleaning the semipermeable membrane surfaces of tubular modules arranged in multiple stages, with increasing numbers of modules in upstream stages where the solution has low solute concentrations, by means of a plurality of elastic elements, such as the sponge balls above referred to, the elements are forced through the tubes of semipermeable membrane in the tubular modules, together with a carrier solution, and the number of the elastic elements is reduced in proportion to the decreasing number of modules in the ensuing, downstream stages. Since the solution being treated under pressure is utilized as the carrier, the semipermeable membrane surfaces can be cleaned while a part of the solution is being separated as the permeated water, thus permitting uninterrupted operation of the apparatus. It is also possible, in accordance with the invention, to avoid the passage of an excessive number of sponge balls through the semipermeable membrane tubes and therefore minimize the wear of the sponge balls as well as of the membranes.

Usually for the treatment of water by reverse osmosis or ultrafiltration, it is customary practice to arrange the membrane modules of the equipment in multiple stages of gradually decreasing numbers of modules like a christmas tree laid on its side and, depending on the quantity of water being treated or the predetermined value of concentration factor, recycle the concentrated brine until the desired concentration is attained, and then discharging part of the brine out of the system. The term concentration factor as used herein is a value as expressed by the following equation and usually ranging from 4 to 5.

$$\text{Concentration factor} = \frac{\text{qty. of solution being treated}}{\text{qty. of conc. brine ultimately obtained}}$$

Thus, the invention described admits of recycling the concentrated brine together with, or independently of, the sponge balls well within its scope.

During the operation of a reverse osmosis apparatus the solution being treated is fed at a pressure between 40 and 80 kg/cm$^2$, whereas an ultrafiltration unit does not require such a high pressure but uses a pressure of at most 20 kg/cm$^2$. Another benefit derivable from the use of sponge balls in either equipment is that they make the streams of the solution turbulent and thereby equalize the osmotic pressures which otherwise vary locally. This is important because the apparatus' capacity of water permeation by membrane separation depends on the pressure applied to the solution being treated minus the normal osmotic pressure of the solution, and the osmotic pressure tends to be higher at the membrane surface of each tube than in the center of the tube.

It is to be understood that the washing means with sponge balls in conformity with this invention may be combined with any known fluid-mechanical or chemical washing method.

Also, it should be noted that heat is of very little importance in carrying the invention into practice.

These and other objects, advantages and features of the invention will become more apparent from the following detailed description when taken in conjunction with the accompanying drawings showing preferred embodiments thereof. In the drawings.

Figure 1:
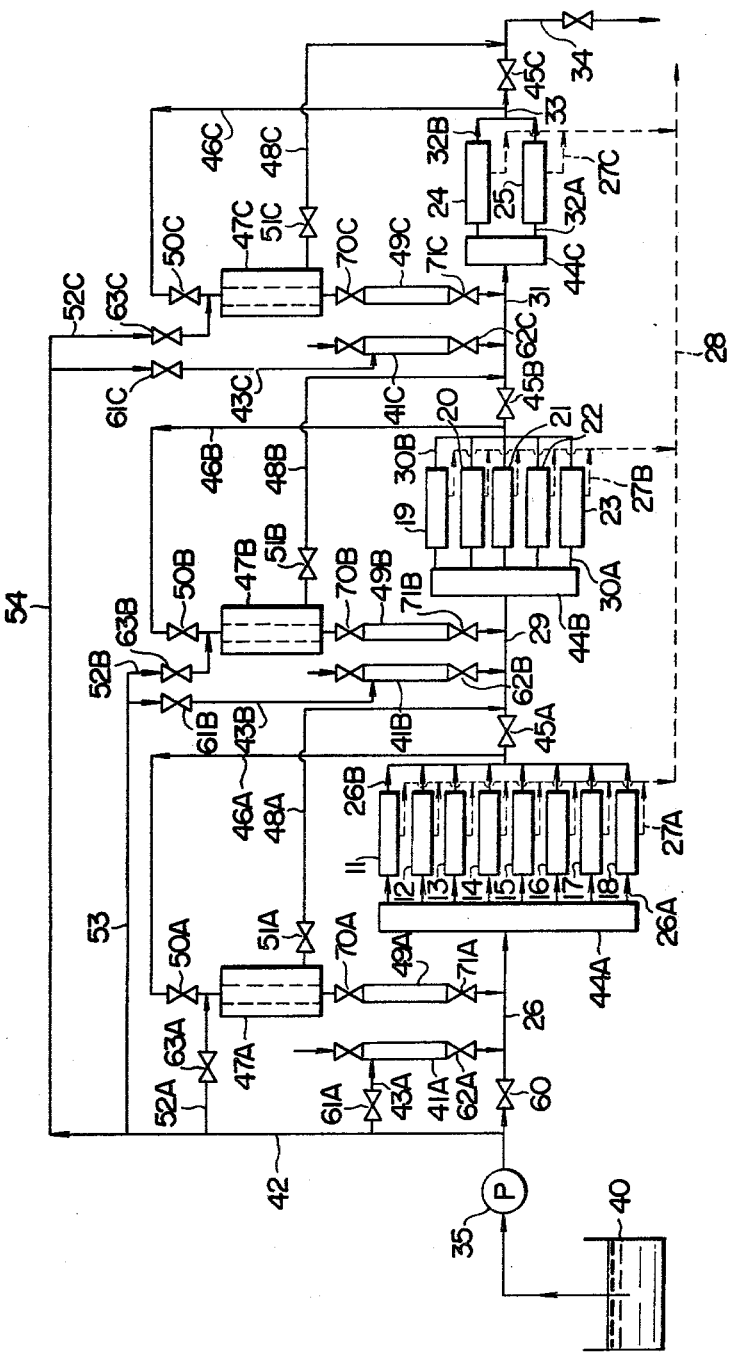
FIG. 1 is a flow sheet of an arrangement embodying the present invention.

Referring now to FIG. 1, there is shown an apparatus for reverse osmosis comprising a total of 15 tubular membrane modules connected in multiple stages. The number of such modules is not critical but may be freely chosen to suit the type and quantity of the solution to be handled. In the embodiment shown, the modules are parallelly arranged and connected in three stages, i.e., eight modules (indicated at 11-18) in the first stage, five (19-23) in the second stage, and two (24, 25) in the third and final stage. A solution to be treated is subjected to a predetermined pressure and fed by a pump 35 from a tank 40 to the modules 11-18 in the first stage via line 26 and branch pipes 26A. The solution in the first-stage tubular modules is separated into permeated water that has moved through the semipermeable membranes with which the tubes are lined and concentrated brine that leaves the modules unpermeatingly. The permeated water portions are taken out through outlet pipes 27A and collected in a collecting line 28. On the other hand, the brine is transferred to the second-stage modules 19-23 through branch pipes 26B, line 29, and branch pipes 30A.

In the same manner as with the modules 19-23, the charge is treated and the permeated water is taken out through outlet pipes 27B and collected in the line 28, whereas the concentrated brine flows through branch pipes 30B, line 31, and branch pipes 32A into the third-stage modules 24, 25. Again, by the same procedure, the permeated water is separated through outlet pipes 27C and collected in the line 28. The further concentrated brine is discharged from the system through branch pipes 32B, line 33, and finally through line 34. Usually, feed solution is easily concentrated in this way, with the solute concentration eventually increased four- to five-fold. Also, the final concentration of the permeated water may be about one-tenth to one-twentieth the initial value of the solution and, depending on the quality of water being treated, the water thus obtained may be readily reused.

Next, cleaning of the semipermeable membrane surfaces by sponge balls will be described, particularly in connection with the tubular modules in the first stage.

A sufficient number of sponge balls for use with the first-stage modules are contained in a sponge ball feeder 41A. When valves 61A, 62A are opened and the valve 60 is slightly throttled, a branched stream of the pressurized feed from the solution tank 40 bypasses the line 26, flows through lines 42, 43A and back into the line 26, carrying the sponge balls from the feeder 41A. After all of the sponge balls have been carried away from the feeder 41A, the valves 60, 61A, 62A are set to the original positions. The balls are moved, together with the solution to be treated which serves as a carrier, to a sponge ball distributor 44A installed on the upstream side of the stack of modules 11–18. They are distributed there in substantially equal numbers and are forced through the branch pipes 26A into the individual modules 11–18.

After the passage through the modules, the sponge balls are put together with the concentrated brine toward the line 29 by way of the branch pipes 26B. Because a valve 45A installed on the line 29 is closed in advance, the brine and balls are conducted through line 46A into a sponge ball collector 47A, where the brine is separated from the balls and is flown back to the line 29 via line 48A. In this way the concentrated brine alone is fed to the modules in the following stage. When the sponge balls used to clean the semipermeable membrane surfaces are to be recycled, the valve 60 is throttled and valves 63A, 71A are opened. The balls will then be carried away by the solution fed from the tank 40 through lines 42, 52A, into the line 26 via another sponge ball feeder 49A. Transfer of the sponge balls from the collector 47A to the feeder 49A is accomplished by either closing valves 50A, 51A and opening valves 45A, 70A immediately after the arrival of all the balls from a run for semipermeable membrane cleaning at the collector or by allowing the brine to flow through the lines 46A, 48A until the next cleaning run and then closing the valves 50A, 51A and opening the valves 45A, 70A just before the cleaning.

Cleaning of the modules in the second stage is carried out generally in the same manner as with the first-stage modules. The number of sponge balls required for this stage (less than that for the first stage) are stored in a sponge ball feeder 41B. Opening valves 61B, 62B allows the solution from the tank 40 to flow through lines 42, 53, 43B into the line 29, carrying the sponge balls from the feeder. The balls are introduced into a sponge ball distributor 44B installed on the upstream side of the modules 19–23, where they are distributed in substantially equal numbers among the respective modules and supplied thereto via branch pipes 30A. After the passage through the modules 19–23, the sponge balls together with the concentrated brine are collected via branch pipes 30B into line 31. Because a valve 45B on the line is in closed position, the brine and balls in the line 31 are conveyed through line 46B to a sponge ball collector 47B, where the concentrated brine is separated from the sponge balls and is returned to the line 31 via line 48B. In the meantime, the balls recovered by the sponge ball collector 47B are transferred to another sponge ball feeder 49B when the valves 45B, 70B are opened and valves 50B, 51B are closed. When the sponge balls recovered and held by the sponge ball feeder 49B are to be reused, it is only necessary to open valves 63B, 71B. The balls will then be carried by the solution being fed from the tank 40 through lines 42, 53, 52B into the line 29.

The third-stage modules are cleaned in the similar way. As with the modules in the first and second stages, the sponge balls enough for the modules in this stage (fewer than in the second stage) are stored in a sponge ball feeder 41C. If valves 61C, 62C are turned open, the solution fed from the tank 40 via lines 42, 54, 43C will carry the balls away from the feeder into the line 41. The sponge balls are divided into substantially equal numbers by a distributor 44C on the upstream side of the modules 23, 24 and are introduced into those modules by way of branch pipes 32A. Past the modules 24, 25, the sponge balls are collected, together with the concentrated brine, into line 33 via branch pipes 32B. Since a valve 45C remains closed, the brine and balls in the line 33 are led through line 46C into a sponge ball collector 47C, where the concentrated brine is separated from the sponge balls and returned to the line 33 via line 48C. On the other hand, the sponge balls held back in the collector 47C is transferred to a sponge ball feeder 49C when valves 45C, 70C are opened and valves 50C, 51C are closed. Where the recovered sponge balls in the feeder 49 are to be reused, valves 63C, 71C are opened and the balls are carried away from the feeder by the solution admitted from the tank 40 through lines 42, 54, 52C, into the line 31.

Since the respective stages of modules may be washed independently of one another, it is possible to clean selectively any stage that requires cleaning. Needless to say, all stages may be cleaned concurrently. The sponge balls are introduced into the modules from the upstream side, together with the solution from the tank, and this does not bring any increase in the concentration of the solution inside the modules.

Figure 2:
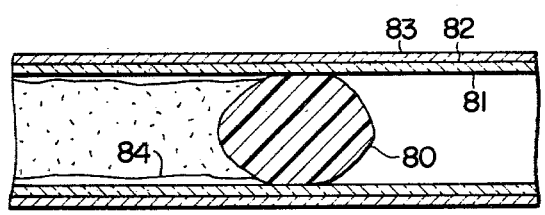
FIG. 2 is a typical sectional view of a tube with a sponge ball forced therethrough.

The sponge balls achieve their mechanical cleaning effect as they pass, together with the solution or concentrated brine, through the modules 11–25 in contact with the inside surfaces of semipermeable membranes, and rub off the deposit of contaminants and other solids from the membrane surfaces. The manner in which each sponge ball cleans the semipermeable membrane surface is typically represented in FIG. 2.

The semipermeable membrane 81 in a tubular form is surrounded by a semipermeable membrane support member 82, which in turn is held within a pressure-resistant pipe 83. Thus, the support member 82 is integrally combined with the pressure-resistant pipe 83 to constitute a semipermeable membrane-backing tube. The sponge ball 80 is slightly larger in diameter than the tube of semipermeable membrane, so that the ball can rub off the deposit 84 at a stroke from the inside surface of the membrane. While a generally round ball is shown, it should be understood that the invention is not limited thereto; the ball may be replaced by a plurality of sponge balls having a diameter smaller than the inside diameter of the tube of semipermeable membrane 81 (and which need not be round). Such smaller balls or elements flown with the solution may clean the membrane surface as well.

Figure 3:
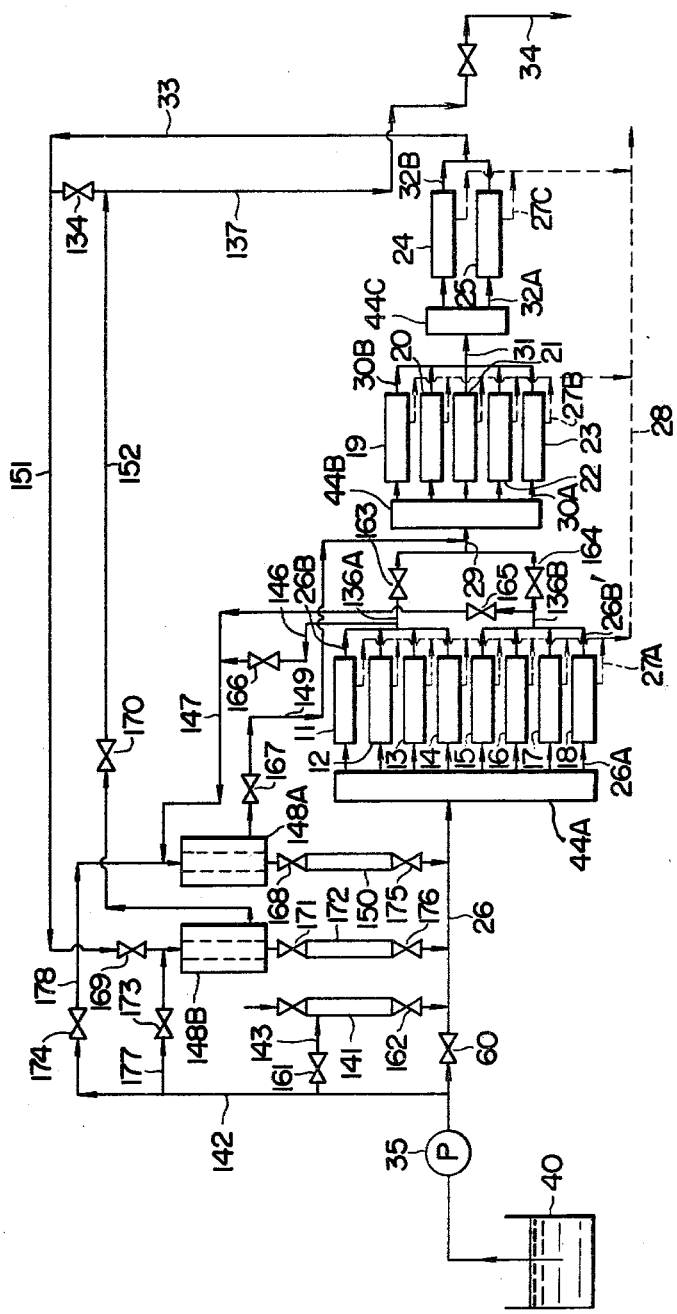
FIG. 3 is a flow sheet of another embodiment of the invention.

A second embodiment of this invention will be described below in connection with FIG. 3, where like parts have been given like numbers with respect of FIG. 1, and explanation of those parts is omitted.

A sufficient number of sponge balls for use with the first-stage modules are contained in a sponge ball feeder 141. When valves 161, 162 are opened and a valve 60 is slightly throttled, a branched stream of the pressurized feed from a solution tank 40 carries the sponge balls from the feeder into the line 26. After all of the sponge balls have been carried away from the feeder 141, the valves 60, 161, 162 are set to the original positions. The balls are moved, together with the solution to be treated which serves as a carrier, to a sponge ball distributor 44A installed on the upstream side of the stack of modules 11–18. They are distributed there in substantially equal numbers among the modules 11–18 and are forced through branch pipes 26A into the modules.

The sponge balls that have passed through the modules 11–14 are put together with the concentrated brine toward line 136A by way of branch pipes 26B, and the balls that have passed through the modules 15–18 are collected in line 136B via branch pipes 26B'. Because valves 163, 165 remain closed, the brine and balls in the line 136A are conducted through lines 146, 147 into a sponge ball collector 148A, where the brine is separated from the balls and is flown through line 149 back to the line 29, where it joins the main stream of the solution being streated. In this arrangement, a half of the total number of the elastic elements introduced into the first stage is supplied to the modules in the second stage. The sponge balls collected in the sponge ball collector 148A is transferred to a sponge ball feeder 150 when valves 166, 167 are closed and valves 163, 165, 168, 175 are opened.

On the other hand, the concentrated brine and sponge balls in the line 29 reach a sponge ball distributor 44B installed on the upstream side of the modules 19–23 in the second stage, and the balls are distributed in substantially equal numbers to the modules 19–23 an then are forced into the individual modules via branch pipes 30A. After passage through the modules 19–23, the sponge balls together with the concentrated brine are collected via branch pipes 30B into line 31 and thence into a sponge ball distributor 44C. The elastic elements are distributed to modules 24, 25 through branch pipes 32A, and, past the modules, they are collected in line 33 via branch pipes 32B. Because of a valve 134 in closed position, the concentrated brine and sponge balls in the line 33 are conveyed through line 151 to a sponge ball collector 148B, where the brine is separated from the balls and is discharged through lines 152, 137 and thence through line 34. Meanwhile, the sponge balls recovered by the collector 148B are moved to a sponge ball feeder 172 by opening a valve 134 and closing valves 169, 170. When the sponge balls circulated, recovered, and stored in the feeders 150, 172 in the manner described are to be reused, it is only necessary to throttle the valve 60 slightly and open the valves 168, 171, 173, 174, 175, 176. The solution from the tank 40 will then flow through lines 142, 177, 178 into the sponge ball feeders 150, 172 to carry the balls with it into the line 26 for recycling in the way already described.

Figure 4:
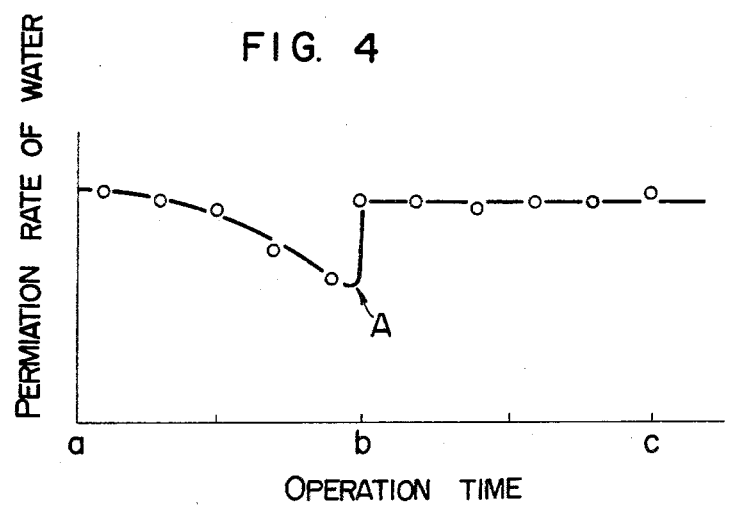
FIG. 4 is a graph showing the results of an experiment conducted in accordance with the invention.

FIG. 4 graphically illustrates the results of an experiment, indicating that the permeation rate of water across semipermeable membranes, once on a downgrade due to the deposition on the membrane surfaces, rebounded to the initial level upon cleaning with sponge balls. The point A is where the introduction of the balls into the semipermeable membrane tubes was started. Before the sponge balls were forced into the tubes (or during the period a–b in the graph), the permeation rate of water gradually declined. As for the period after the introduction of the sponge balls (or during the period b–c in the graph), the permeation rate of water returned to the original level immediately after the introduction and a substantially unchanged rate was maintained from then onward, thus indicating a conspicuous cleaning effect of the sponge balls upon the semipermeable membrane surfaces.

What we claim is:

1. In a tubular membrane separation process which includes feeding a solution to be treated, with the application of pressure, to a module comprised of a tube of a semipermeable membrane and a liquid-permeable support member surrounding the membrane so that a solvent component of the solution can pass through the membrane, and collecting the solvent that has transferred through the membrane with the concomitant production of a concentrated solution in the tubular membrane, a plurality of said modules being connected in parallel to form a stage, a plurality of the stages being connected in series, and said modules arranged in gradually decreased numbers for the stages where the concentration of the solute increases, the improvement comprising passing elastic elements, together with the solution being treated, to the stages, distributing the elastic elements to the modules of the stages, and forcing a plurality of these elastic elements, together with a solution being treated, through the semipermeable membrane in each of the modules, controlling the number of elastic elements passed to any one stage such that said elastic elements are gradually decreased in number in proportion to the reduction in number of modules per stage, said elastic elements each being softer than said semipermeable membrane, removing deposits from said semipermeable membrane tube by mechanically rubbing an inside surface of the semipermeable membrane tube with said elastic elements as said elements are forced through said semipermeable membrane tube and collecting the elements flowed through the flow passages in each stage and recycling these elements to the upstream end of the same stage.

2. A process as claimed in claim 1, wherein said elastic elements are sponge balls of rubber.

3. A process as claimed in claim 1, wherein each of said elastic elements has an outer diameter at least equal to the diameter of said flow passage.

4. A process as claimed in claim 1, wherein each of said elastic elements has an outer diameter less than the diameter of said flow passage.

5. A process for separating a solute in a solution to be treated from a solvent in the solution, comprising the steps of:

preparing a plurality of parallel modules arranged in multiple stages, each of said modules having a tubular semipermeable membrane and a liquid-permeable support surrounding the membrane, said membrane having an inner periphery thereof defining a flow passage, an adjacent two stages of said multiple stages being in communication with each other, and an upstream stage of the adjacent two stages having modules greater in number than that of an adjacent downstream stage, introducing the solution under pressure from a source into a first stage of said multiple stages for flow of the solution through the flow passages in the respective modules to permeate a part of the solvent in the solution through the semipermeable membranes in the respective modules and to concentrate the remainder of the solution, introducing the concentrated solution discharged from the upstream stage into the adjacent downstream stage for flow of the concentrated solution through the flow passages in the respective modules to permeate a part of the solvent in the concentrated solution through the semipermeable membranes in the respective modules and to further concentrate the remainder of the concentrated solution, introducing a plurality of elastic elements, wherein said elastic elements each being softer than said semipermeable membranes in the respective modules, together with a solution being treated, independently into each of said multiple stages for flow of the elastic elements from an upstream end to a downstream end through each of the flow passages in the respective modules in each of said multiple stages to remove deposits on the inner peripheries of the respective membranes, said elastic elements removing deposits from the inner peripheries of said respective membranes by mechanically rubbing inner peripheries of the respective membranes with said elastic elements as said elements flow from an upstream end to a downstream end through the flow passages of said membranes, and controlling the introduction of the plurality of elastic elements into each of the multiple stages so that said elastic elements introduced into the upstream stage of the adjacent two stages are greater in number than and independent from those elastic elements introduced into the adjacent downstream stage, the elastic elements being distributed for flow through the flow passage in all of the stages in substantially equal numbers, and collecting the elastic elements flowed through the flow passages in each stage and recycling the elements in the upstream end of the same stage.

6. An apparatus for separating a solute in a solution to be treated from a solvent in the solution, comprising:

a plurality of parallel modules arranged in multiple stages, each of said modules having a semipermeable membrane and a liquidpermeable support surrounding said membrane to support the latter, said membrane having an inner periphery thereof defining a flow passage, an upstream stage of the adjacent two stages of said multiple stages having modules greater in number than that of an adjacent downstream stage, means for introducing the solution under pressure from a source into a first stage of said multiple stages for flow of the solution through the flow passages in the respective modules to permeate a part of the solvent in the solution through the semipermeable membranes in the respective modules and to concentrate the remainder of the solution, means for communicating the adjacent two stages of said multiple stages with each other to introduce the concentrated solution discharged from the upstream stage of said two adjacent stages, into the adjacent downstream stage for flow of the concentrated solution through the flow passages in the respective modules to permeate a part of the solvent in the concentrated solution through the semipermeable membranes in the respective modules and to further concentrate the remainder of the concentrated solution, elastic elements, to be introduced into each of the flow passages in the respective modules in each stage, means positioned upstream of each of said multiple stages respectively for independently introducing a plurality of the elastic elements, with said elastic elements each being softer than said semipermeable membranes in the respective modules, together with a solution being treated into each of the multiple stages, said means for introducing a plurality of the elastic elements including means for controlling the number of elastic elements introduced into each stage, whereby the number of elastic elements introduced into the downstream stage of any two adjacent stages is less than introduced into the adjacent upstream stage of the two adjacent stages, means associated with each of said multiple stages respectively for receiving the elastic elements from said means for introducing said elastic elements to distribute the elastic elements into each of the flow passages in the respective modules in each stage, for flow of the elastic elements from an upstream end toward a downstream end through each of the flow passages to remove deposits on the inner peripheries of the respective membranes, whereby said elastic elements remove deposits from inner peripheries of said respective membranes by mechanically rubbng said inner peripheries with said elements as said elements flow from an upstream end toward a downstream end through each of the flow passages, means positioned downstream of each of said multiple stages respectively for separating the elastic elements and the liquid carrier from each other, said means for communicating being in flow communication with the means for separating the elastic carrier and the liquid carrier from each other, whereby the separated liquid carrier can be introduced into the adjacent downstream stage, and recycle means, in communication with said means positioned downstream of each of said multiple stages and in communication with said means positioned upstream of each of said multiple stages, for collecting and recycling the elastic elements which have passed through the flow passages to the upstream end of the same stage.

7. An apparatus as claimed in claim 6, wherein said elastic elements are sponge balls of rubber.

8. An apparatus as claimed in claim 6, wherein each of said elastic elements has an outer diameter at least equal to the diameter of said flow passage.

9. An apparatus as claimed in claim 6, wherein each of said elastic elements has an outer diameter less than the diameter of the flow passage.

10. A process for separating a solvent component from a liquid comprising a solute by means of a tubular semipermeable membrane, said tubular semipermeable membrane surrounded by a liquid-permeable support member to form a separation module, a plurality of said modules being arranged in parallel to form a unit, a plurality of said units being connected in series and having a descending number of said separation modules per each successive unit of said series proceeding from an upstream end of said series to a downstream end of said series, comprising:

(a) providing a number of elastic elements, said elastic elements each being softer than said semipermeable membrane, to said liquid comprising a solute;

(b) providing said liquid comprising said elastic elements of step (a) under pressure to an initial upstream unit comprising said modules resulting in separation of said liquid into a solvent component and a concentrated liquid component from flow through said modules of said initial unit with concomitant cleansing of an internal surface of said tubular membranes by said elastic elements, said elastic elements cleansing said internal surface of said tubular membranes by mechanically rubbing said internal surface of said tubular membranes with said elastic elements as said elements flow through said modules of said initial unit;

(c) providing an additional number of elastic elements to said concentrated liquid component of said liquid comprising a solute resulting from separation by said modules of said initial upstream unit of step (b), said additional number of elastic elements being less than said number provided according to step (a);

(d) providing said concentrated liquid component comprising said additional elastic elements of step (c) under pressure to a successive unit of said series following said initial upstream unit resulting in further concentration of said concentrated liquid component of step (b) from flow through said modules of said successive unit and consequent separation of said solvent component with concomitant cleansing of corresponding tubular membrane internal surfaces by said additional elastic elements, said additional elastic elements cleansing said corresponding tubular membrane internal surfaces by mechanicaly rubbing said corresponding tubular membrane internal surfaces with said additional elastic elements as said additional elements flow through said modules of said successive unit;

(e) separating and collecting independently said elastic elements used according to steps (b) and (d) from said concentrated liquid component after passage through said modules of said units of steps (b) and (d); and (f) recycling said independently collected separated elastic elements of step (e) to an upstream end of the same unit to which said elastic elements were provided according to steps (b) and (d) for reuse in cleansing of said tubular membranes of the same unit.

11. A process according to claim 10, wherein said elastic elements are sponge balls of rubber.

12. A process according to claim 11, wherein said sponge balls are distributed in substantially equal numbers among said modules of said units according to steps (b) and (d).

13. A process according to claim 12, wherein said liquid comprising a solute is brine.

14. A process as claimed in claim claim 5, wherein the introduction of elastic elements into each of the stages is controlled so that the elements introduced to a downstream stage of two adjacent stages is decreased in number in proportion to the decrease in number of modules per stage.

15. A process as claimed in claim 10, wherein the additional number of elastic elements provided to the concentrated liquid component in step (c) is less than the number of elastic elements provided to the liquid in step (a) in proportion to the decrease in the number of separation modules in the successive unit following said initial upstream unit relative to the number of separation modules in said initial upstream unit.

16. A process as claimed in claim 1, wherein the elastic elements are distributed uniformly to the modules of each stage, whereby a substantially equal number of elastic elements flow in each flow passage in all of the stages.

17. An apparatus as claimed in claim 6, wherein the means for controlling the number of elastic elements introduced into each stage is adapted to introduce a decreased number of elastic elements to the downstream stage of two adjacent stages in proportion to the decrease in number of modules in the downstream stage, and the means associated with each of said multiple stages is adapted to uniformly distribute the elastic elements into each of the flow passages in the respective modules in each stage, whereby a substantially equal number of elastic elements flow in each flow passage in all of the stages.

* * * * *